Feb. 27, 1951     F. A. PETER     2,543,054

VEHICLE

Filed Feb. 4, 1947     7 Sheets-Sheet 1

Inventor

Friedrich A. Peter

By Stowell & Evans
         Attorneys Feb. 27, 1951 F. A. PETER 2,543,054
VEHICLE
Filed Feb. 4, 1947 7 Sheets-Sheet 3

Inventor:
Friedrich A. Peter
By Stowell & Evans
Attorneys.

Feb. 27, 1951   F. A. PETER   2,543,054
VEHICLE

Filed Feb. 4, 1947   7 Sheets-Sheet 7

Inventor:
Friedrich A. Peter
By Stowell & Evans
Attorneys.

Patented Feb. 27, 1951

2,543,054

UNITED STATES PATENT OFFICE 2,543,054

VEHICLE

Friedrich A. Peter, Palampur, Punjab, India

Application February 4, 1947, Serial No. 726,325

16 Claims. (Cl. 280—33)

This invention relates to vehicles and more particularly to a train of vehicles having improved mobility in rough country and to a specially equipped vehicle for operation in such trains.

An object of the invention is to provide a vehicle train, preferably a train of tracklaying vehicles such as tanks, which is capable of negotiating terrain and obstacles ordinarily impassable by a single vehicle. The invention is particularly useful in military tactics.

Another object is to provide a vehicle having special equipment enabling it to form an element or component of such a train by linking up with other vehicles for the purpose of crossing ditches, climbing or descending hills, and otherwise traversing difficult obstacles. The equipment required may be auxiliary in nature and does not interfere with the ability of the vehicle to operate independently in the ordinary manner to accomplish its mission, but does enable it, in conjunction with other vehicles, to overcome terrain obstacles, either natural or artificial, which would stop any one of the vehicles alone.

Additional objects are to provide means enabling one or more tanks or similar vehicles to recover a casualty vehicle and to provide a tank train capable of crushing down a vertical obstacle, such as a wall of a house, without damage to the train.

Still another object is to provide a tank train including a mine destroyer whereby the train may safely cross mine fields.

Although the invention finds special application to tracklaying vehicles such as tanks, its usefulness is not restricted to such vehicles; the principles of the invention may be applied to other land vehicles such as automobiles, trucks, "jeeps" and other wheeled vehicles, especially wheeled vehicles having fore-wheel as well as rear-wheel drive.

The foregoing and other aims, objects and advantages of the invention are realized in a vehicle train comprising a plurality of vehicles arranged in column, coupling means uniting adjacent vehicles, joint means in the coupling means uniting the first two vehicles of the column providing a pivot about which the first vehicle may rotate in a vertical plane, and means carried by said train for exerting a vertical lifting torque upon said first vehicle about said pivoted joint means.

A typical unit or element of the train is a vehicle comprising in combination coupling members at each end of the vehicle adapted to cooperate with corresponding members of adjacent vehicles to provide pivotal linkage about which the vehicle may rotate in a vertical plane, a retractable tension member attached to said vehicle above the pivot point of said linkage and connectible to an adjacent vehicle, and means carried by said vehicle for retracting said tension member.

The vehicle trains and units thereof, as generally described above, are also characterized by having additional cooperating elements, all of which will be set forth with greater particularity in the following detailed description taken in connection with the accompanying drawings, wherein:

Figure 1:
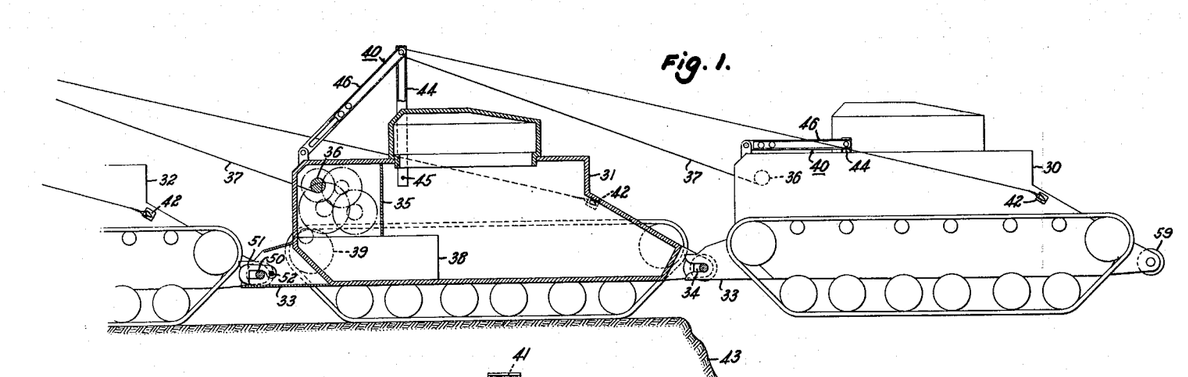
Fig. 1 is a side elevational view of the front end of a tank train in accordance with the invention, one of the tanks being shown in section.
Figures 2, 3:
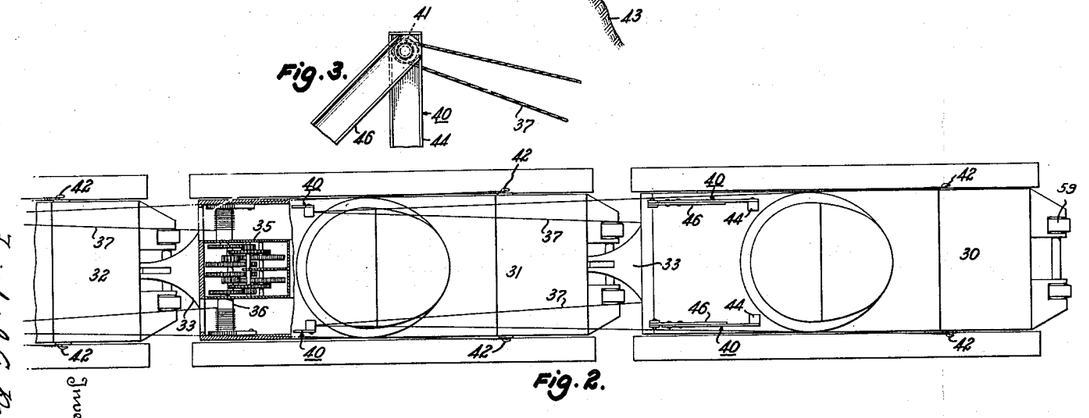
Fig. 2 is a plan view of the train shown in Fig. 1, a part of one of the tanks being broken away.
Fig. 3 is an enlarged fragmentary view of the upper portion of an elevated arm carried by the tanks shown in Figs. 1 and 2.

Referring to the drawings, particularly to Figs. 1 and 2 thereof, there is shown the forward end of a vehicle train composed of a plurality of tracklaying vehicles 30, 31, 32, etc., specifically tanks. The tanks are united in column by means of coupling members 33, to be described in detail hereinafter. The coupling members 33 include an articulated joint 34 about which the tank units of the train may swing laterally or horizontally, so that the column may make turning movements, and also may be rotated in a vertical plane for reasons which will appear more fully as the description proceeds.

Each of the tanks of the column is provided with means whereby the tank may be operated, preferably from within, against the stable portion of the column to raise or lower itself in a substantially vertical plane by a pivotal movement about the coupling joint 34. The means for accomplishing this result, in the train of Figs. 1 and 2, includes a power-actuated winch 35 having a pair of laterally spaced drums 36 about which cables 37 are wound. The winch may be powered by an independent engine or may even be manually operated, but, as shown, is powered by the main tank engine 38 through a clutch-controlled, power take-off 39. The winch functions in the usual manner under control of an operator to pay out or take in the cables 37.

Cables 37 from the first tank 30 pass from the winch drums back to elevated brackets 40 carried by the second tank 31. The cables are threaded about sheaves 41 positioned near the tops of the brackets and are returned forwardly and secured to the sides of tank 30 by looping eyes formed in the free ends of the cables over hooks 42 fastened to the tank armor.

It will be seen that the operator of tank 30 may cause his tank to rotate vertically about the pivot 34 between tanks 30 and 31 by taking in or paying out cable as desired. In fact, where the stable weight of the column behind the first tank is sufficient to support the weight of the first tank, as where in a train of two tanks, the second tank is much heavier than the first, or the train is composed of three or more tanks of equal weight and size, the first tank can lift itself entirely free of the ground and be supported and moved by the remainder of the column. As shown in Fig. 1, tank 30 is supported by the units of the column following it and is suspended over the edge of a bank 43 completely out of contact with the ground.

The brackets 40 are provided to give added purchase for elevating and lowering tank units. They may be dispensed with where the configuration of the vehicle is such that satisfactory leverage can be achieved by connecting the supporting cables to a point on the vehicle proper. The brackets 40, of Figs. 1, 2, and 3, are retractable from within the tank and are shown in retracted position on tank 30. The upright member 44 is a compression member and slides in a bearing formed in the top armor of the tank. It may be retained in raised position by a pin 45 passing through a hole in the lower end of the member and engaging a locking recess at the inner side wall of the tank. Link 46 is an extensible member which, when the bracket is elevated, acts in tension to resist stresses tending to pull the bracket forward. The bracket shown is merely examplary, and other suitable constructions may be employed instead, provided they can be retracted to permit complete traverse of the tank turret and gun (not shown).

Figures 4, 5:
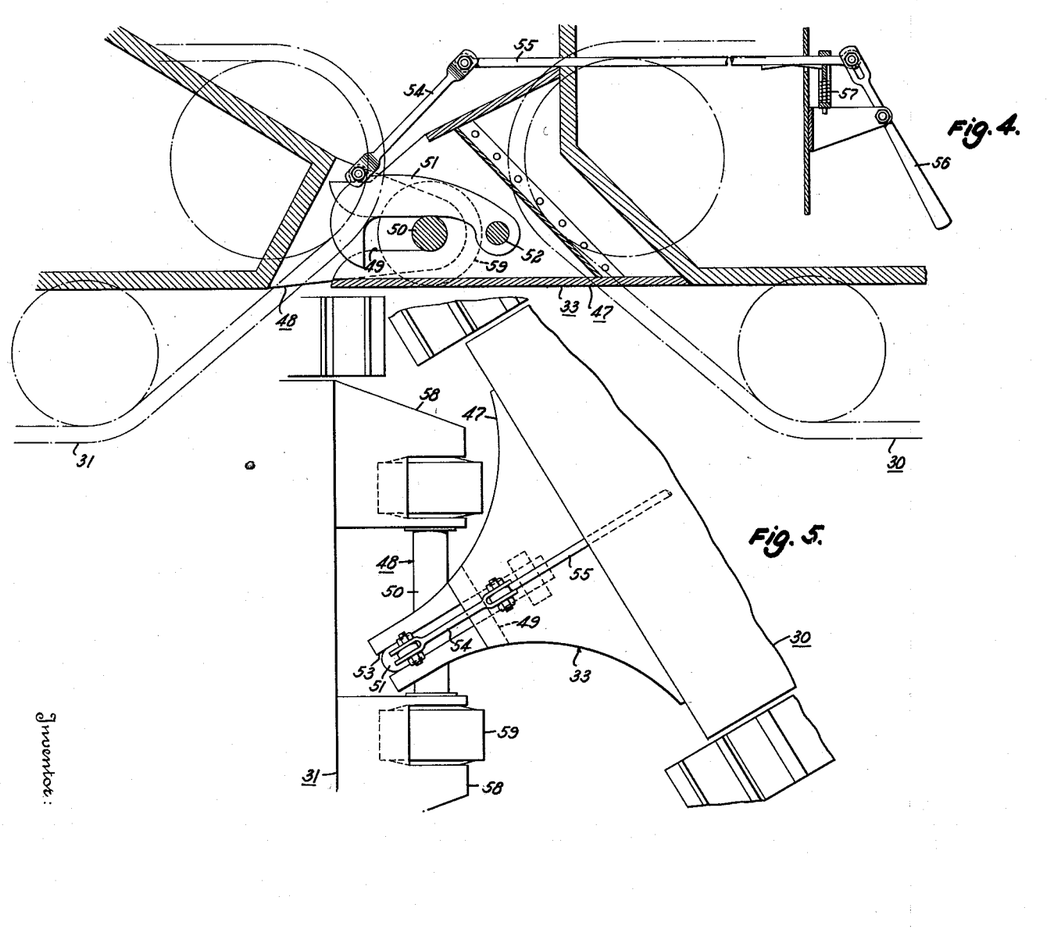
Fig. 4 is an enlarged side elevational view, parts being shown in section, of a coupling member and associated structure embodied in the train of Figs. 1 and 2.
Fig. 5 is a plan view of the coupling member and associated structure shown in Fig. 4.

Coupling members 33 and their associated structure are shown in enlarged detail in Figs. 4 and 5. They include a rear coupling element 47 welded to the rear of one tank and a cooperating front coupling element 48 attached to the front end of an adjacent following tank. The rear coupling element flares forwardly as seen in Fig. 5 to provide a wide base for attachment to the tank and a narrow tail having a rearwardly opening transverse slot 49, the rear end of the slot being flared outwardly to facilitate entry of the bar 50 of a cooperating front coupling element during hitching, where the cooperating elements may be somewhat out of vertical alignment due to uneven ground. The flaring shape of the rear coupling element also permits lateral turning of a column of vehicles as illustrated in Fig. 5.

A coupling hook 51, pivoted on the front coupling element at 52, rocks in a slot 53 to open and close the slot 49 and to retain the bar 50 in the slot or to allow it to be withdrawn. It will be seen that the closed slot 49 is elongated to permit the bar 50 to lie at various angles in the slot during turning movements of the train. The hook may be operated from within the tank 30 through the linkage system including the link 54, the sliding rod 55 and the lever 56. A spring lock 57 may be employed to retain the linkage system and the hook 51 in fixed position.

The bar 50 of the front coupling element is mounted in bearing brackets 58 welded to the front of tank 31. There may also be provided a pair of laterally spaced small wheels or rollers 59 which serve to assist the tank in leveling off after an abrupt descent.

Figure 6:
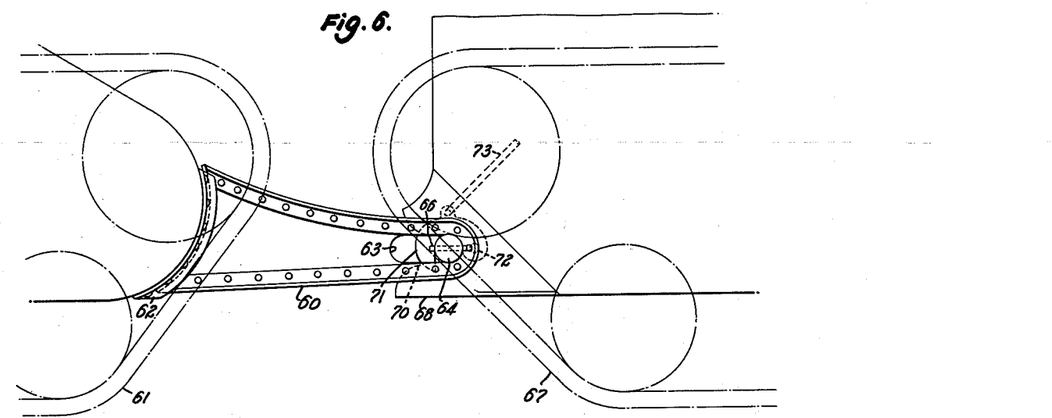
Fig. 6 is a side elevational view similar to Fig. 4 of a modified form of coupling member.
Figure 7:
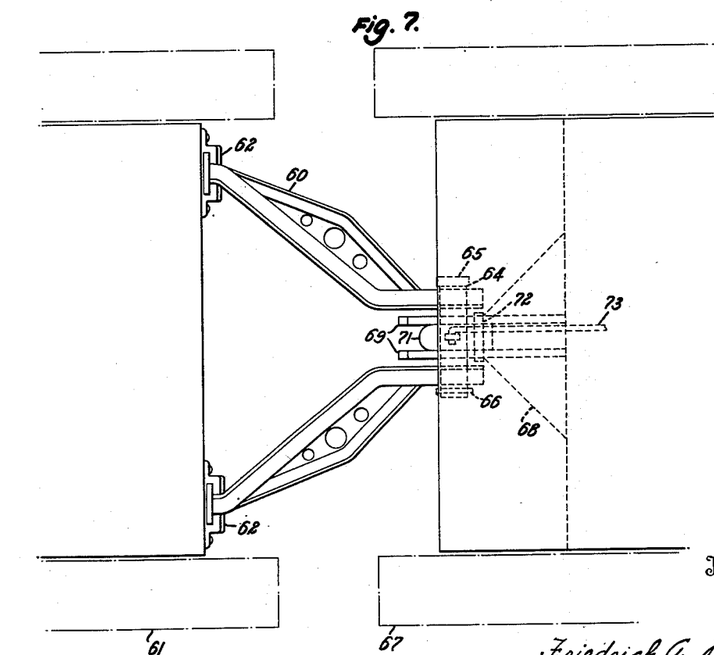
Fig. 7 is a plan view of the coupling member of Fig. 6.

An alternative form of coupling member is shown in Figs. 6 and 7. In this form, the front coupling elements 60 of a following tank 61 are removably attached to the tank. They are slidably received in slotted brackets 62 riveted to the front armor of tank 61 and may be removed from the brackets when not needed and stored in the vehicle or in a special vehicle carrying a number of the coupling elements required for the formation of a train. The coupling elements 60 converge forwardly and have elongated longitudinal slots 63 formed near their front ends. Through these slots is passed a transverse bar 64 removably retained in the assembly by a cap 65 at one end and a key 66 at the other end.

The leading tank 67 has a rear coupling element cooperating with the front coupling element of the following tank for uniting the tanks in column. The element 68 has a pair of rearwardly projecting web members 69 providing an open-ended slot 70 which receives the bar 64 of the cooperating coupling element, the latter being retained in the slot by a hook 71 pivoted on the pin 72 and operable by a link 73 to engage or release the bar from inside the tank.

The coupling member of Figs. 6 and 7 permits the desired vertical plane movement of the tank units in column and also, owing to the play of bar 64 in slot 63, permits limited turning movement of the column. Vehicles equipped with this coupling member, when operating individually, run little risk of damaging their rear coupling elements by having the latter dig into the ground as the tank begins an abrupt ascent. The front coupling elements, being removable, are not subject to damage in separate operation of a unit.

One advantage of the particular combination of coupling members and tension members hereinbefore described is that it eliminates any tendency for a raised vehicle to twist about its axis and thus to capsize. The extent of lateral contact between the bar and slot joint of the coupling member resists in some degree this tendency, but the spacing of lifting cables on either side of the center line of the tank provides a stable suspension completely obviating any such tendency.

Tank trains in operation are shown in Figs. 8 through 16. The train shown in Fig. 8 differs from those shown in Figs. 9 through 14 and 16, essentially in that the former has elevated points of attachment for the lifting cables whereas, in the latter, the lifting cables are attached directly to the tank body. The train of Fig. 15 includes a mine destroyer enabling it to clear a path through a mine field.

Figures 8, 9, 10, 11, 12, 13:
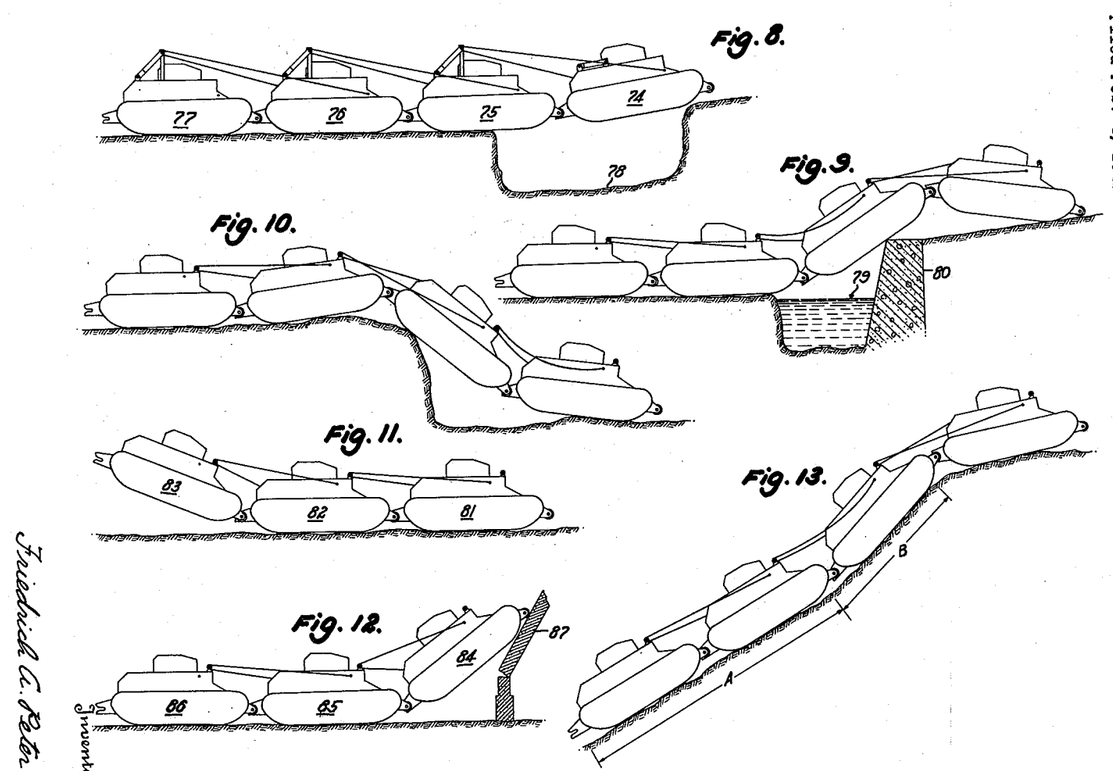
Figs. 8 through 16 are side elevational views on a reduced scale showing tank trains embodying the principles of the invention in operation.

Fig. 8 illustrates how a train of four tanks can cross a ditch approximately one and one-half times as wide as the length of or wheel base of the vehicle. The leading tank 74 has been lifted against the stable succeeding part of the column consisting of tanks 75—77 and the latter have been caused to simulate a substantially rigid member by tightening their respective lifting cables. The front end of tank 74 is raised to a level such that when it is projected across the ditch 78 its tracks will engage the ground on the opposite side. The view of Fig. 8 shows the stiffened column about to make forward contact with the far side of the ditch. As soon as tank 74 is firmly upon the far ground, it may apply traction through its treads to assist succeeding tanks across the ditch. The center tanks of the train are assisted across the ditch by tanks on either side thereof. The last tank 77 is suspended, much in the manner of the last tank of Fig. 20, and is carried across the ditch by the forward elements of the column.

It will be understood that a company or team of tanks in action will normally operate as separate units, and, where equipped in accordance with the present teachings, will link up in train only for the negotiation of unusual obstacles. Thereafter, they will uncouple and proceed as separate units.

Fig. 9 shows a train of tanks crossing a tank trap comprising a moat 79 having an elevated concrete embankment 80 bounding its far side. No single tank could, without assistance, cross this trap. The train, employing the techniques outlined in the discussion of Fig. 8, is enabled to do so. The figure shows the train in transit, the first tank being fully across and the second tank in position to level off after crossing the trap.

Descent of an escarpment nearly as high as the length of a tank is illustrated by Fig. 10, a feat which would wreck any single tank.

In Fig. 11, the forward tanks 81 and 82 are shown carrying a casualty tank 83.

Fig. 12 shows how tanks in column may be utilized to crush down a wall. The leading tank 84, having raised itself to a rather high angle, is moved by tanks 85 and 86 against the wall 87. As contact is made, with the wall, the cables of tank 84 are released swinging the tank in a descending arc against the wall toppling it over as indicated. The wall falls away from the tank and not upon it, as where the tank simply rams the wall.

Fig. 13 illustrates a hill climbing maneuver. That portion of the hill designated A has a slope near the limit of hill climbing ability of a single tank, while the portion designated B has a slope greater than such limit; thus a single tank could not climb to the brow of the hill. In train, the tanks are able to reach the top. That part of the column below the steep portion B assists forward tanks up the steep incline. Vehicles above the portion B drag succeeding vehicles up an otherwise impossible grade.

Figures 14, 15:
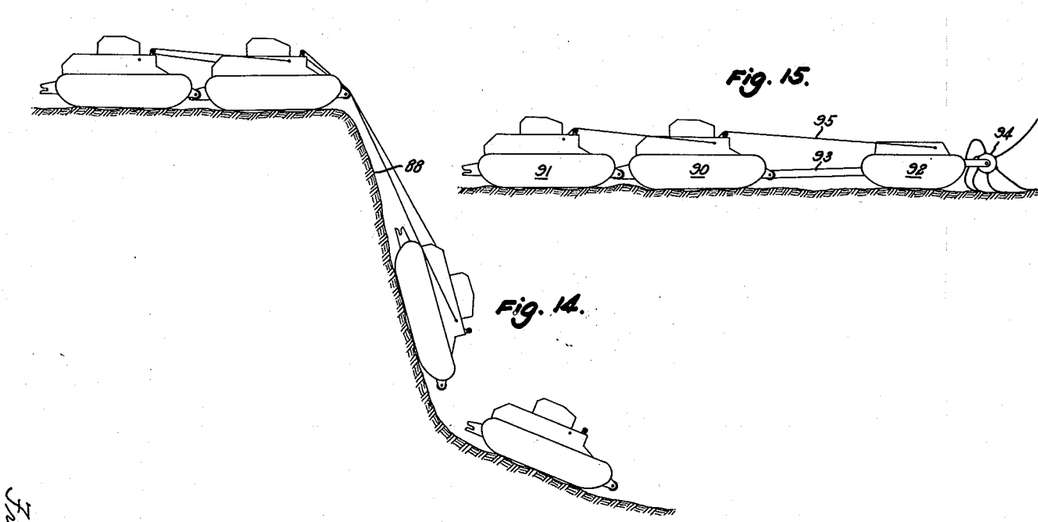
Figure 16:
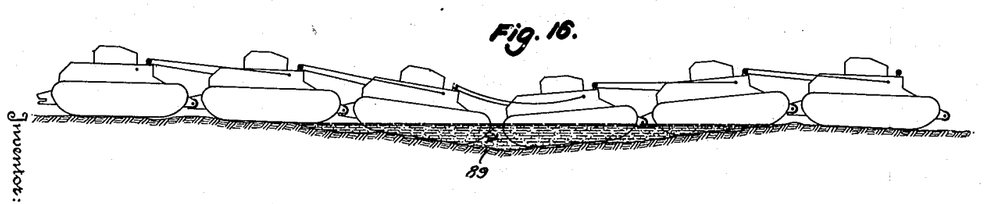

Where, as in Fig. 14, a cliff 88 is too high for tanks to descend in coupled train, they may lower themselves singly, provided sufficient cable is available on the winch drums. The last one or two tanks to descend may hook their cables to an anchor or dead man (not shown). Tanks may also scale such cliffs by reversing the in- unusual obstacles.

A bog or marsh frequently presents an impassable obstacle to a single tank. The coupled column of Fig. 16 has no difficulty in negotiating a bog 89 as will be apparent.

Returning to Fig. 15, the train, including tanks 90 and 91, pushes before it a mine destroyer 92. The mine destroyer need not be manned nor powered; it is merely pushed ahead of the column at a safe distance by a bar 93. The flail or beater 94 may be rotated through gearing to the tracks of the destroyer 92. Cable 95, operated by a winch in tank 90 is used to carry the destroyer over unusual obstacles.

In the modification of train shown in Fig. 15, it will be noted that the power for raising and lowering a vehicle is supplied through a cable from a winch in the next succeeding vehicle. It will be evident that a similar arrangement may be employed alternatively in the tank trains hereinbefore described.

As hereinbefore described, the tank units of the several trains incorporate identical auxiliary equipment thus enabling any number of such vehicles to link up and any vehicle to take any position in the column. For various reasons it may be desirable to modify the equipment so that only one or two of the vehicles of the column are provided with retractable tension members for effecting a lifting action. A form of vehicle for this purpose is illustrated in Fig. 17 and details of certain of its parts are shown in Figs. 18 and 19.

Figure 17:
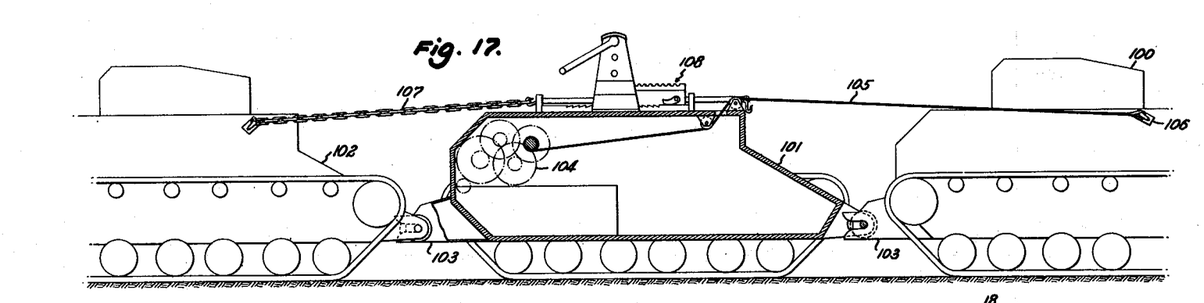
Fig. 17 is a fragmentary side elevational view of the front end of an alternative form of tank train embodying the principles of the invention; one of the tanks being shown in section.
Figures 18, 19:
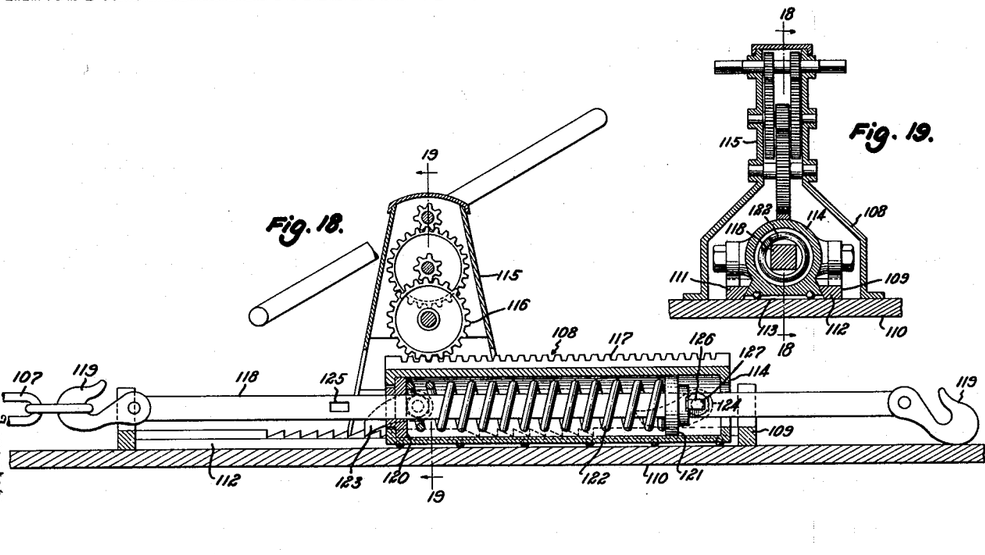
Fig. 18 is an enlarged detail sectional view of a spring tensioning device shown on one of the tanks of Fig. 17 and taken along the line 18—18 of Fig. 19.
Fig. 19 is a sectional view taken along the line 19—19 of Fig. 18.

Referring to Fig. 17, there is shown the front portion of a train of vehicles, the leading vehicle being designated 100 and the succeeding vehicles being designated 101 and 102 seriatim. The second vehicle 101 is the specially equipped tank. It may be a modified armored recovery vehicle similar to a tank but not equipped for fighting.

The train has a type of coupling member 103 permitting the required vertical rotation of the tank units. Tank 101 has a winch 104, preferably power-actuated, and cables 105 connected to the leading tank 100 at hooks 106. It will be seen that the leading tank can be raised and lowered by means of this mechanism.

No mechanism is provided by which the third tank may lift the second. However, alternative means is provided for yieldingly resisting downward swinging of the second tank. Such means includes a chain or pair of chains 107 positioned above the common coupling member of the tanks and connecting them together through an adjustable resilient tensioning mechanism generally designated 108.

Turning to Figs. 18 and 19, the mechanism 108 includes a frame 109 fastened to the tank armor 110 as by welding. The frame has a pair of longitudinally disposed ratchet bars 111, 112 having ratchet teeth oriented in opposite directions. In a channel 113 formed between the ratchet bars slides a spring housing 114. A hand crank and gear drive 115 is provided for sliding the spring housing in its channel, driving connection being effected between pinion 116 and rack 117.

An elongated bar 118 extends through the spring housing and has hooks 119 at either end to which a chain may be attached. The bar is supported slidably in discs 120, 121 which in turn slidably engage the inner walls of the spring housing 114. A strong compression spring 122 is coiled about the bar 118 between the discs 120 and 121. Pawls or dogs 123, 124 are mounted on the bar 118 for selective engagement with the ratchet bars 111, 112. The bar 118 is also provided with transverse holes 125, 126, through either of which a key 127 may be passed. Keys may also be placed in both holes.

The tensioning mechanism 108 is constructed to apply tension in either a forward or rearward direction. As arranged in Fig. 18, it exerts a forward pull on the chain 107. The spring housing has been racked to the right from its neutral position in which the chain 107 has been easily hooked to the bar 118. This movement of the housing has placed the spring 122 under compression between the disc 120, which remains in its end position, and the disc 121, which has been drawn to the left by the key 126. Any desired degree of tension within the limits of spring 122, may be applied to the chain 107 by sliding the spring housing 114 to an appropriate position.

With a key in the hole 125, it will be apparent that tension can be applied in the opposite direction by racking the spring housing 114 to the left.

Figure 20:
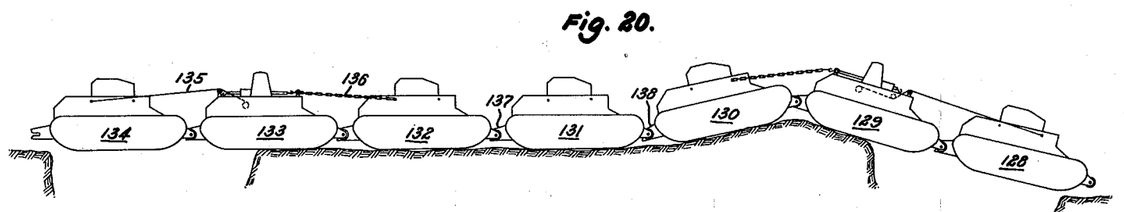
Figs. 20 and 21 are reduced side elevational views of still further modified forms of tank trains in operation.

Referring to Fig. 20, there is shown a train of seven tanks in column, the second vehicle 129 of the train being the special vehicle described with reference to Figs. 17-19. The penultimate vehicle 133 is similar to vehicle 129 with the essential differences that the lifting cables 135 extend rearwardly to control the elevation of the last tank 134 of the column and the spring-tensioned chains 136 extend forwardly and are attached to the antepenultimate tank 132. The center tank 131 is linked in the column only by the jointed coupling members 137—138 and is not provided with any tension member connection to adjacent tanks. It has been found that it is only necessary to provide tension members for the first three and the last three tanks of a column; other tanks in the column will be carried over obstacles without any need for tension members. Operation of the train of Fig. 20 is in accordance with the principles hereinbefore set forth; inspection of the figure shows the manner in which the front and rear of the column cross wide ditches.

Figure 21:
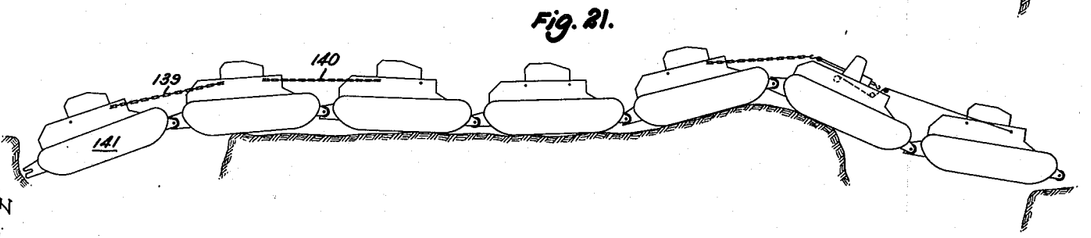

The train of Fig. 21 is like that of Fig. 20 with the principal difference that the tension members at the rear of the column are fixed chain cables 139 and 140 having no spring tensioning mechanisms. Although the last tank 141 may have a tendency to drop slightly in crossing a ditch, this tendency is not pronounced and does not interfere with successful operation of the train.

As hereinbefore pointed out, the trains of the invention are ordinarily formed as temporary assemblages for the purpose of negotiating difficult ground. However, the tension members may be slacked off while the column is linked up through the coupling members, and, in this condition the column may travel along winding roads if desired, the coupling members allowing sufficient lateral flexibility to enable the column to make the ordinary turns.

It will also be understood in the light of the description that the coupling members may provide only for pivoting of the tank units about a horizontal axis, lateral turning movements being precluded.

From the foregoing description it will be seen that the present invention provides a vehicle train capable of negotiating country impassable to a single vehicle. It also provides a special vehicle having equipment enabling it to be incorporated in the trains of the invention. It will be seen that where sufficient stability is provided for the second or the penultimate vehicle of a column, such vehicle may serve as a base about which the leading or trailing vehicle may be pivoted to accomplish the results of the invention.

The several modifications of the invention hereinbefore described are merely exemplary and not limitative. Alternative constructions will occur to those skilled in the art. For example, various mechanisms may be provided for raising and lowering the elevated arm to which the cables are attached, including hydraulically operated devices. It is also contemplated that hydraulic mechanisms may be utilized for extending and retracting the tension members interconnecting adjacent vehicles and that such tension members may be of rigid construction capable of transmitting compression forces, as well as, of course, tensions especially as the air in the compression chamber can be utilized to absorb shocks.

What is claimed is:

1. A vehicle train comprising a plurality of self-propelled vehicles arranged in column, coupling means uniting adjacent vehicles, each of said coupling means being positioned between the rear end of the ground-engaging support means of a leading vehicle and the front end of the ground-engaging support means of a following vehicle, joint means in the coupling means uniting the first two vehicles of the column providing a single pivotal axis about which the first vehicle may rotate in a vertical plane, and means carried by said train for exerting a vertical lifting torque upon said first vehicle about said pivoted joint means.

2. A vehicle train comprising a plurality of self-propelled tracklaying vehicles arranged in column, coupling means uniting adjacent vehicles, each of said coupling means being positioned between the rear end of the ground-engaging portion of the track of a leading vehicle and the front end of the ground-engaging portion of the track of a following vehicle, joint means in the coupling means uniting the first two vehicles of the column providing a single pivotal axis about which the first vehicle may rotate in a vertical plane, and means carried by said train for exerting a vertical lifting torque upon said first vehicle about said pivoted joint means, said torque exerting means comprising a retractable tension member attached to one of said first two vehicles above the pivot point of said joint means and connected to the other of said first two vehicles, and power-actuated means carried by said one vehicle for retracting said tension member.

3. A vehicle train comprising a plurality of self-propelled tracklaying vehicles arranged in column, coupling means uniting adjacent vehicles, each of said coupling means being positioned between the rear end of the ground-engaging portion of the track of a leading vehicle and the front end of the track of a following vehicle, the coupling means uniting the first two vehicles having a joint about which the first vehicle may rotate in a vertical plane on a single pivotal axis and also, to a limited extent, in a horizontal plane, and power-actuated means carried by said train to exert a vertical lifting torque upon said first vehicle about said joint.

4. A vehicle train comprising a plurality of tracklaying vehicles arranged in column, coupling means uniting adjacent vehicles, the coupling means uniting the first two vehicles having a joint about which the first vehicle may rotate in a vertical plane on a single pivotal axis and also, to a limited extent, in a horizontal plane, and means carried by said train to exert a vertical lifting torque upon said first vehicle about said joint, said torque exerting means comprising a pair of retractable tension members attached to one of said first two vehicles above the joint of said coupling means and connected to the other of said first two vehicles, said tension members being laterally spaced to apply a lifting torque substantially free from axial twisting moment upon said first vehicle about said joint, and power-actuated means carried by said one vehicle for retracting said tension members.

5. A vehicle train comprising a plurality of self-propelled vehicles arranged in column, coupling means uniting adjacent vehicles, each of said coupling means being positioned between the rear end of the ground-engaging support means of a leading vehicle and the front end of the ground-engaging support means of a following vehicle, each of said coupling means having a joint about which adjacent vehicles may rotate in a vertical plane on a single pivotal axis, and power-actuated means carried by each vehicle of said train except one of the end vehicles and connected to an adjacent vehicle in the direction of said excepted vehicle for exerting a vertical lifting torque as between adjacent vehicles about their respective coupling joints.

6. A vehicle train comprising a plurality of self-propelled tracklaying vehicles arranged in column, coupling means uniting adjacent vehicles, each of said coupling means being positioned between the rear end of the ground-engaging portion of the track of a leading vehicle and the front end of the ground-engaging portion of the track of a following vehicle, each of said coupling means having a joint about which adjacent vehicles may rotate in a vertical plane on a single pivotal axis, and power-actuated means carried by each vehicle of said train except one of the end vehicles and connected to an adjacent vehicle in the direction of said excepted vehicle for exerting a vertical lifting torque as between adjacent vehicles about their respective coupling joints.

7. A vehicle train comprising a plurality of self-propelled tracklaying vehicles arranged in column, coupling means uniting adjacent vehicles, each of said coupling means being positioned between the rear end of the ground-engaging portion of the track of a leading vehicle and the front end of the ground-engaging portion of the track of a following vehicle, each of said coupling means having a joint about which adjacent vehicles may rotate in a vertical plane on a single pivotal axis, extension means mounted on each vehicle except the first and providing an anchor above the normal silhouette of the vehicle, retractable tension members carried by each vehicle of said train except the last and connected to the anchor of the extension means of the adjacent following vehicle, and power-actuated means carried by the vehicles for retracting their respective tension members.

8. A vehicle train comprising a plurality of self-propelled tracklaying vehicles arranged in column, coupling means uniting adjacent vehicles, each of said coupling means being positioned between the rear end of the ground-engaging portion of the track of a leading vehicle and the front end of the ground-engaging portion of the track of a following vehicle, each of said coupling means having a joint about which adjacent vehicles may rotate in a vertical plane on a single pivotal axis and also, to a limited extent, in a horizontal plane, extension means mounted on each vehicle except the first and providing an anchor above the normal silhouette of the vehicle, retractable tension members carried by each vehicle of said train except the last and connected to the anchor of the extension means of the adjacent following vehicle, and power-actuated means carried by the vehicles for retracting their respective tension members.

9. A vehicle train comprising at least three tracklaying vehicles arranged in column, coupling means uniting adjacent vehicles, each of said coupling means having a joint about which adjacent vehicles may rotate in a vertical plane on a single pivotal axis, power-actuated means carried by the second vehicle of the train and connected to the first vehicle for exerting a vertical lifting torque upon said first vehicle about the joint of their common coupling means, a retractable tension member connected between the second and third vehicles of said train above their common coupling joint, and resilient means carried by said second vehicle for exerting tension upon said tension member.

10. A vehicle train comprising at least three tracklaying vehicles arranged in column, coupling means uniting adjacent vehicles, each of said coupling means having a joint about which adjacent vehicles may rotate in a vertical plane on a single pivotal axis, power-actuated means carried by the second vehicle of the train and connected to the first vehicle for exerting a vertical lifting torque upon said first vehicle about the joint of their common coupling means, a retractable tension member connected between the second and third vehicles of said train above their common coupling joint, spring means carried by said second vehicle for exerting tension upon said tension member, and means for adjusting the force applied by said spring to said tension member.

11. A vehicle train comprising at least four tracklaying vehicles arranged in column, coupling means uniting adjacent vehicles, each of said coupling means having a joint about which adjacent vehicles may rotate in a vertical plane on a single pivotal axis, power-actuated means carried by the second vehicle of the train and connected to the first vehicle for exerting a vertical lifting torque upon said first vehicle about the joint of their common coupling means, a retractable tension member connected between the second and third vehicles of said train above their common coupling joint, resilient means carried by said second vehicle for exerting tension upon said retractable tension member, and a fixed tension member connecting the last vehicle with the penultimate vehicle of the train limiting downward rotation of said last vehicle about the joint of the common coupling means.

12. A vehicle train comprising at least five tracklaying vehicles arranged in column, coupling means uniting adjacent vehicles, each of said coupling means having a joint about which adjacent vehicles may rotate in a vertical plane on a single pivotal axis, power-actuated means carried by the second vehicle of the train and connected to the first vehicle for exerting a vertical lifting torque upon said first vehicle about the joint of their common coupling means, a retractable tension member connected between the second and third vehicles of said train above their common coupling joint, resilient means carried by said second vehicle for exerting tension upon said retractable tension member, and fixed tension members connecting the last three vehicles of the train limiting downward rotation of the last two vehicles about the coupling joints connecting them with the next adjacent preceding vehicle.

13. A vehicle train comprising at least four tracklaying vehicles arranged in column, coupling means uniting adjacent vehicles, each of said coupling means having a joint about which adjacent vehicles may rotate in a vertical plane on a single pivotal axis, power-actuated means carried by the second vehicle of the train and connected to the first vehicle for exerting a vertical lifting torque upon said first vehicle about the joint of their common coupling means, a retractable tension member connected between the second and third vehicles of the train above their common coupling joint, resilient means carried by said second vehicle for exerting tension upon said tension member, second power-actuated means carried by the penultimate vehicle of the train and connected to the last vehicle of the train for exerting a vertical lifting torque upon said last vehicle about the joint of their common coupling means, a second retractable tension member connected between the penultimate and the antepenultimate vehicles of said train above their common coupling joint, and resilient means carried by said penultimate vehicle for exerting tension upon said second retractable tension member.

14. A self-propelled tracklaying vehicle for operation in train comprising in combination coupling members at each end of said vehicle adapted to cooperate with corresponding members of adjacent vehicles to provide pivotal linkage about which the vehicle may rotate in a vertical plane on a single pivotal axis, the front one of said coupling members extending forwardly of the ground-engaging portion of the track and the back one of said coupling members extending rearwardly of the ground-engaging portion of the track, a retractable tension member attached to said vehicle above the pivot point of said linkage and connectible to an adjacent vehicle, and power-actuated means carried by said vehicle for retracting said tension member.

15. A vehicle as defined in claim 14 and having an upright member extending above the normal silhouette of the vehicle providing an elevated point of attachment for a tension member connectible from an adjacent vehicle.

16. A vehicle train comprising a plurality of self-propelled vehicles arranged in column, coupling means uniting adjacent vehicles, each of said coupling means being positioned between the rear end of the ground-engaging support means of a leading vehicle and the front end of the ground-engaging support means of a following vehicle, joint means in said coupling means providing pivots about which adjacent vehicles may rotate in a vertical plane on a single pivotal axis, and means carried by said train for exerting a lifting torque on one of said vehicles about one of said joint means.

FRIEDRICH A. PETER.

REFERENCES CITED

The following references are of record in the file of this patent:

UNITED STATES PATENTS

| Number | Name | Date |
|---|---|---|
| 1,515,756 | Roy | Nov. 18, 1924 |
| 2,321,677 | Higgins | June 15, 1943 |
| 2,360,654 | Day | Oct. 17, 1944 |
| 2,360,901 | Simmons | Oct. 24, 1944 |

FOREIGN PATENTS

| Number | Country | Date |
|---|---|---|
| 541,887 | Germany | Jan. 18, 1933 |